(12) United States Patent
Kim et al.

(10) Patent No.: US 11,577,701 B2
(45) Date of Patent: Feb. 14, 2023

(54) WIPER DEVICE

(71) Applicant: CAP CORPORATION, Gyeongsangbuk-do (KR)

(72) Inventors: Myoung Yeon Kim, Ulsan (KR); Jae-Yong Jeong, Daegu (KR)

(73) Assignee: CAP CORPORATION

(*) Notice: Subject to any disclaimer, the term of this patent is extended or adjusted under 35 U.S.C. 154(b) by 96 days.

(21) Appl. No.: 16/915,841

(22) Filed: Jun. 29, 2020

(65) Prior Publication Data
US 2021/0009082 A1    Jan. 14, 2021

(30) Foreign Application Priority Data
Jul. 9, 2019  (KR) .......................... 10-2019-0082815

(51) Int. Cl.
*B60S 1/38*  (2006.01)

(52) U.S. Cl.
CPC ........... *B60S 1/3806* (2013.01); *B60S 1/3801* (2013.01); *B60S 2001/3813* (2013.01); *B60S 2001/3815* (2013.01); *B60S 2001/3843* (2013.01)

(58) Field of Classification Search
CPC ........ B60S 1/3801; B60S 1/3806; B60S 1/38; B60S 2001/3843; B60S 2001/3813; B60S 2001/3815
USPC ............. 15/250.43, 250.44, 250.201, 250.46
See application file for complete search history.

(56) References Cited

U.S. PATENT DOCUMENTS

| | | | |
|---|---|---|---|
| 8,671,505 B2* | 3/2014 | Ku ......................... | B60S 1/3801 15/250.46 |
| 2004/0187247 A1* | 9/2004 | Torii ........................ | B60S 1/38 15/250.201 |
| 2007/0084007 A1* | 4/2007 | Hwa ...................... | B60S 1/3806 15/250.201 |
| 2014/0053361 A1* | 2/2014 | Amano ................. | B60S 1/3801 15/250.453 |
| 2014/0189974 A1* | 7/2014 | Yang ..................... | B60S 1/3801 15/250.32 |
| 2016/0280187 A1* | 9/2016 | Satou ..................... | B60S 1/3801 |

FOREIGN PATENT DOCUMENTS

| JP | 2006-021650 | 1/2006 |
|---|---|---|
| KR | 10-2014-0105708 | 9/2014 |

OTHER PUBLICATIONS

Korean Office Action dated Aug. 23, 2020 in corresponding Korean Patent Application No. 10-2019-0082815 (machine translation).

* cited by examiner

*Primary Examiner* — Gary K. Graham
(74) *Attorney, Agent, or Firm* — Grossman, Tucker, Perreault & Pfleger, PLLC

(57) ABSTRACT

A wiper device is disclosed. The wiper device coupled to a wiper arm to remove a foreign substance of the present invention includes a contact member configured to wipe off the foreign substance, a pressing member configured to press the contact member to be in contact with a windshield, and a cover member configured to cover the pressing member, wherein the cover member is provided with a supporting unit formed with a coupling hole and the pressing member is provided with a coupling unit configured to be inserted into the coupling hole to be coupled with the supporting unit.

6 Claims, 6 Drawing Sheets

WIPER DEVICE

CROSS REFERENCE TO RELATED APPLICATION(S)

This application claims the benefit under 35 USC § 119(a) of Korean Patent Application No. 10-2019-0082815 filed on Jul. 9, 2019 in the Korean Intellectual Property Office, the entire disclosure of which is incorporated herein by reference for all purposes.

BACKGROUND

1. Field

The present invention relates to a wiper device.

2. Description of Related Art

When a windshield of a vehicle in driving is contaminated by various substances, including dust in the atmosphere or rain or snow, it becomes difficult to secure a clear view and can affect the safety of driving. Thus, a wiper for clearing snow, rain, or debris is equipped on the windshield in order to secure the clear view for the safety of a driver. The wiper device is connected to a wiper arm installed in the vehicle and is operated by the wiper arm.

A cover member is used in the wiper device to protect parts such as a lever. However, a problem arises that the cover member is often separated from the wiper device by impact during operation

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An object of the present invention is to provide a wiper device in which a cover member is stably engaged and maintained.

According to an aspect of the present invention, there is provided a wiper device coupled to a wiper arm to remove a foreign substance, including a contact member configured to wipe off the foreign substance; a pressing member configured to press the contact member to be in contact with a windshield; and a cover member configured to cover the pressing member, wherein the cover member is provided with a supporting unit formed with a coupling hole and the pressing member is provided with a coupling unit configured to be inserted into the coupling hole to be coupled with the supporting unit.

According to an embodiment of the present invention, the coupling unit formed on the pressing member and the supporting unit formed on the cover member are firmly and securely connected, so that the cover member can maintain the engagement without being separated even under strong impact.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The terms used in the description are intended to describe certain embodiments only, and shall by no means restrict the present disclosure. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, the embodiment of the present invention will be described in detail with reference to the accompanying drawings.

Figure 1:
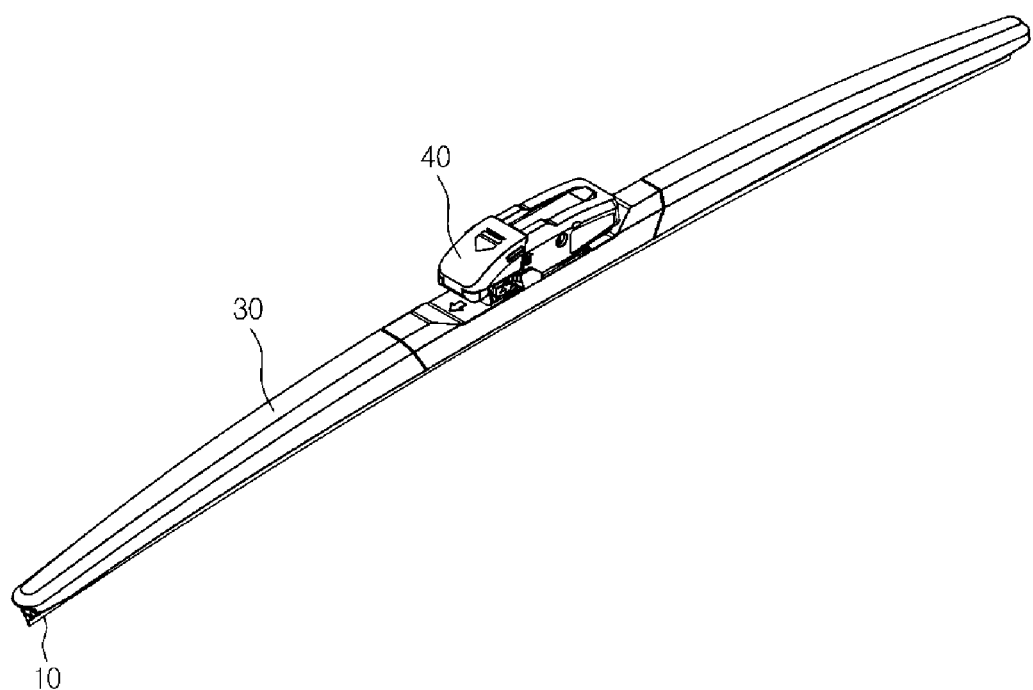
FIG. 1 is a perspective view illustrating a wiper device according to an embodiment of the present invention.
Figure 2:
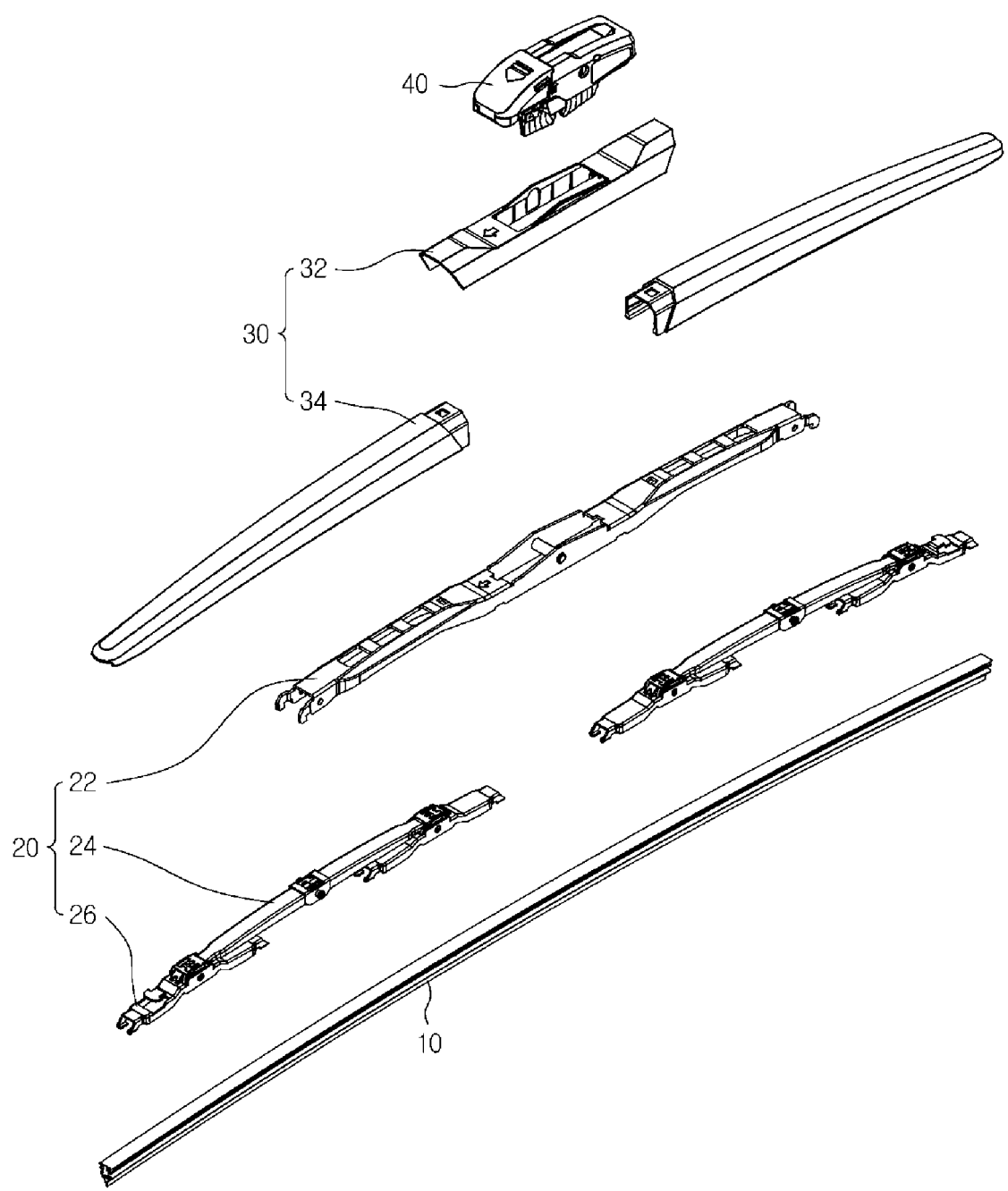
FIG. 2 is an exploded view illustrating a wiper device according to an embodiment of the present invention.

FIG. 1 is a perspective view illustrating a wiper device according to an embodiment of the present invention and FIG. 2 is an exploded view illustrating a wiper device according to an embodiment of the present invention.

The wiper device according to an embodiment of the present invention is a wiper device for removing foreign substances attached to a windshield and includes a contact member 10, a pressing member 20, and a cover member 30.

The contact member 10 may be tightly contacted to a windshield to wipe off foreign substances. The contact member 10 of the present embodiment may be any known contact member such as a wiper blade made of rubber. A supporting member elastically supporting the contact member 10 may be additionally coupled to the contact member 10.

The pressing member 20 may press and support the contact member 10 toward the windshield so that the contact member 10 comes in tight contact with the windshield.

Figure 3:
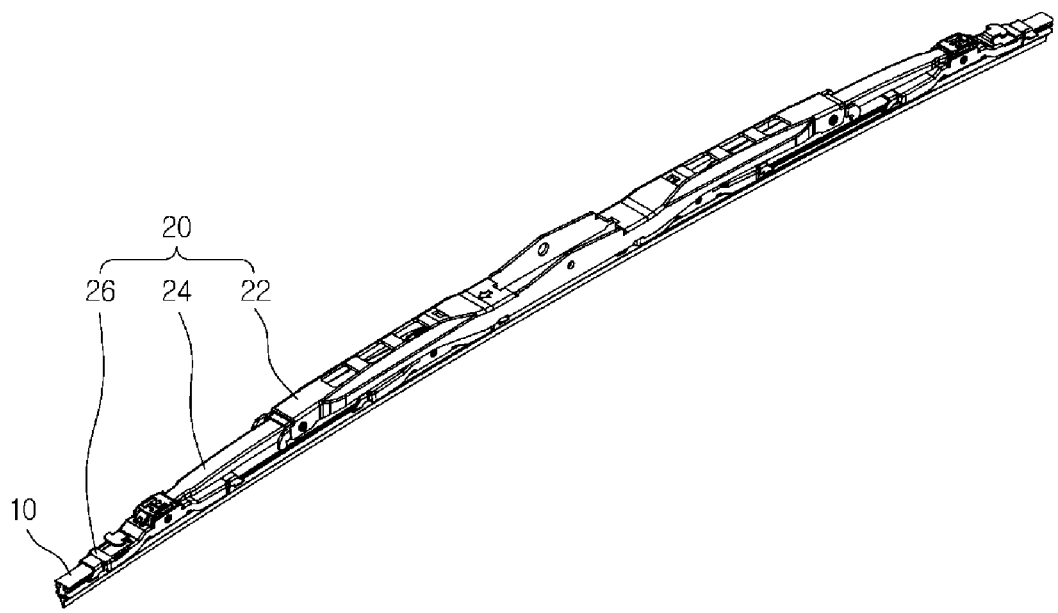
FIG. 3 is a diagram illustrating a pressing member in a wiper device according to an embodiment of the present invention.

FIG. 3 is a diagram illustrating a pressing member in a wiper device according to an embodiment of the present invention.

Referring to FIG. 2 and FIG. 3, the pressing member 20 of the present embodiment may include a lever structure in which a plurality of levers may be connected in a multi-level structure from the wiper arm to the contact member 10. That is, the lever closest to the wiper arm may become the uppermost lever and a plurality of lower levers may be sequentially connected to thereto to expand the structure of the lever toward the contact member 10.

The lever structure may be connected to the wiper arm (not shown) through an adapter 40 to receive a pressing pressure from the wiper arm. The pressing pressure received from the wiper arm may be transmitted to each connected lever and the pressing pressure transmitted to the lever may be transmitted back to the contact member 10 so that the contact member 10 is tightly contacted with a curved surface of the glass windshield.

For example, the lever structure of the present embodiment may include a primary lever 22 and an extension lever 24 hinge-connected to the primary lever 22.

Referring to FIG. 2 and FIG. 3, the lever structure of the present embodiment may include the primary lever 22 disposed at the center and a pair of the extension levers 24 hinge-connected to both ends of the primary lever 22. In addition, a yoke 26 may be hinge-connected to the extension lever 24. A grip unit that holds the contact member 10 may be provided at an end portion of the yoke 26. Based on the multi-level structure of the lever structure, the primary lever 22 may be the uppermost lever and the yoke 26 may be the bottommost lever.

Particularly, the pressing member 20 of the present embodiment may be provided with coupling units 23 and 27 configured to be inserted into and coupled to coupling holes 35b and 36b formed in the cover member 30. For example, the coupling units 23 and 27 may include inserting units 23a and 27a extending in an insertion direction of the coupling holes 35b and 36b and fixing units 23b and 27b extending in a lateral direction from the inserting units 23a and 27a to be hooked to and supported by partition walls 35a and 36a.

Figure 4:
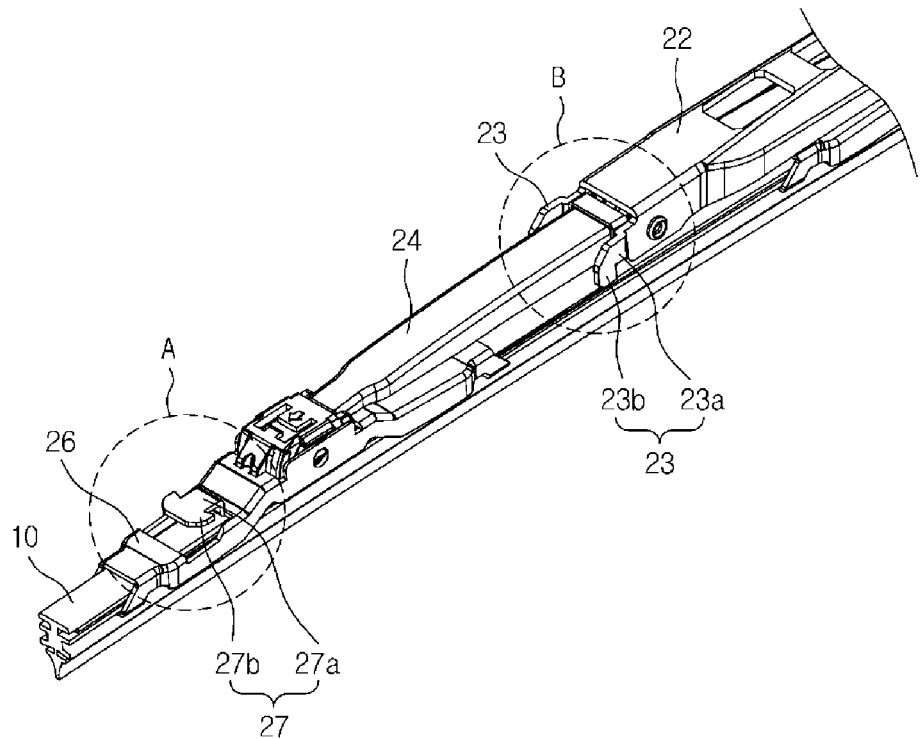
FIG. 4 is an enlarged view illustrating a coupling unit of a pressing member in a wiper device according to an embodiment of the present invention.

FIG. 4 is an enlarged view illustrating a coupling unit of a pressing member in a wiper device according to an embodiment of the present invention.

Referring to FIG. 4, the coupling units 23 and 27 in this embodiment may be installed at a plurality of positions in the pressing member 20. The coupling units 23 and 27 which fix the cover member 30 may be formed on at least one of the levers of the lever structure. For example, the coupling units 23 and 27 may be installed on an upper surface of the yoke 26 and an end of the primary lever 22.

Figure 5:
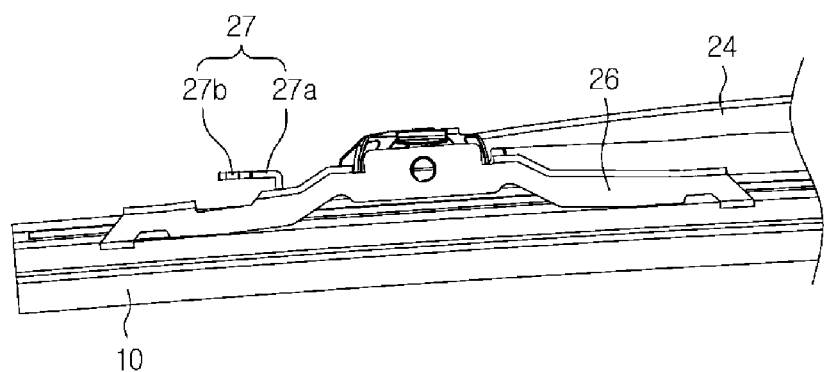
FIG. 5 is an enlarged view illustrating a first coupling unit of a pressing member in a wiper device according to an embodiment of the present invention.

FIG. 5 is an enlarged view of an "A" portion in FIG. 4 illustrating a first coupling unit of a pressing member in a wiper device according to an embodiment of the present invention.

Referring to FIG. 4 and FIG. 5, the first coupling unit 27, which is one of the coupling units 23 and 27 installed at a plurality of positions, may be protruded from an upper surface of the yoke 26, which is one of the plurality of levers. For example, it may be formed to be protruded in a "¬" shape on the upper surface of the yoke 26.

Here, the first coupling unit 27 may be formed by cutting and bending a portion of the upper surface of the yoke 26. When the yoke 26 is made of a metal plate, a part of an upper plate may be cut and bent to form the inserting unit 27a on the upper plate of the yoke 26 and the formed inserting unit 27a may be bent again to face outward (outward based on a lengthwise direction of the pressing member 20) to be formed in a "¬" shape. The fixing units may be formed to be protruded at both ends of the inserting unit 27a. Here, the fixing unit 27b may have a shape such as an arrow or wedge facing outward. The shape of the fixing unit 27b may not be limited to the above-described ones. The fixing unit 27b may be formed in any shape as long as it can be hooked to and supported by the partition wall 35a.

Figure 6:
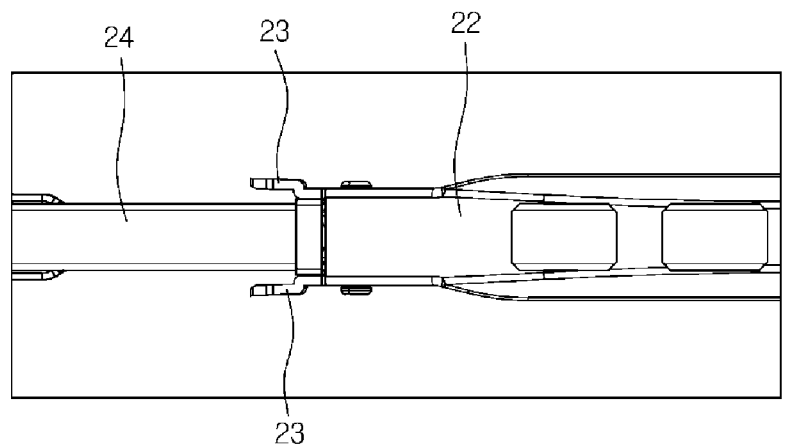
FIG. 6 is an enlarged view illustrating a second coupling unit of a pressing member in a wiper device according to an embodiment of the present invention.

FIG. 6 is an enlarged view of a "B" portion in FIG. 4 illustrating a second coupling unit of a pressing member in a wiper device according to an embodiment of the present invention.

Referring to FIG. 4 and FIG. 6, the second coupling unit 23, which is one of the coupling units 23 and 27 installed at a plurality of positions, may be formed by being extended in a lengthwise direction from an end of the primary lever 22, which is one of the plurality of levers. For example, the second coupling unit 23 may be extended from a hinge of the primary lever 22, to which the extension lever 24 is connected, toward the extension lever 24.

Here, the second coupling unit 23 may be extended from both ends of the pair of the primary levers 22, respectively.

The inserting unit 23a of the second coupling unit 23 may be extended from an end of the primary lever 22 toward the extension lever 24, and the fixing unit 23b may be protruded from a side surface of the inserting unit 23a toward the contact member 10. Here, the fixing unit 23b may have a shape such as a hook pointing downward. Meanwhile, the shape of the fixing unit 23b may not be limited to the above-described ones of the present embodiment. The fixing unit 23b may be formed in any shape as long as it can be hooked to and supported by the partition wall 36a.

The structure of the lever structure in which the primary lever 22, the extension lever 24 and the yoke 26 are hinge-connected is illustrated in the present invention, but is not limited thereto. The pressing member is not also limited to the lever structure.

The cover member 30 may protect the pressing member 20 by covering it. The cover member 30 may have a spoiler function that provides additional pressing pressure to the lever structure with air force.

Particularly, the cover member of this embodiment may be provided with supporting units 35 and 36 in which coupling holes 35b and 36b are formed, so that the coupling units 23 and 27 of the pressing member 20 may be inserted into the coupling holes 35b and 36b to be coupled to the supporting units 35 and 36.

Referring to FIG. 1 and FIG. 2, the cover member 30 of the present embodiment may include a primary cover 32 covering the center of the primary lever 22 and a pair of extension covers 34 covering from the primary lever 22 to the yoke 26.

Figure 7:
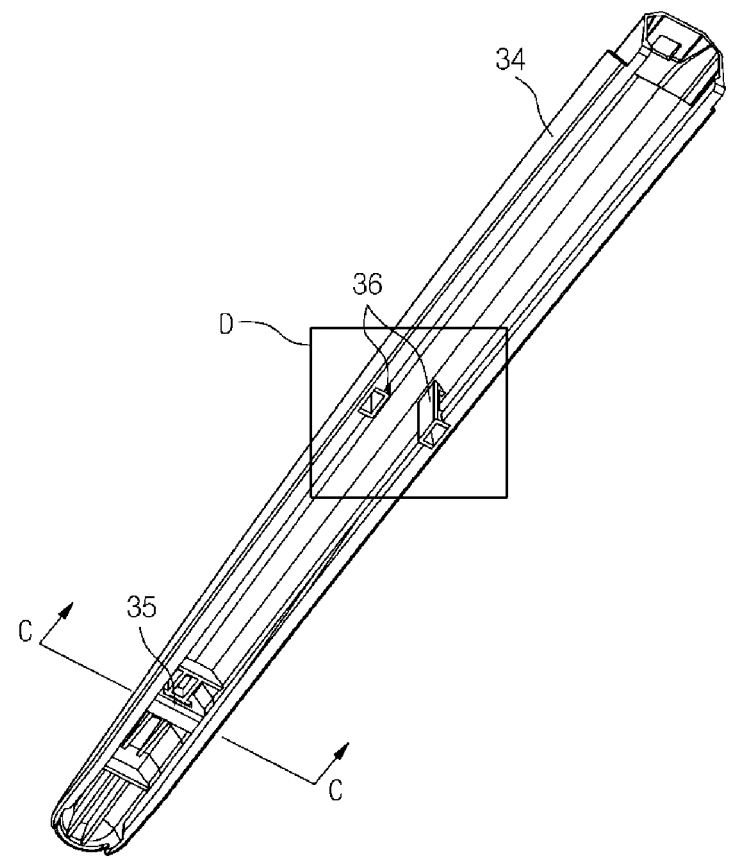
FIG. 7 is a diagram illustrating a cover member in a wiper device according to an embodiment of the present invention.
Figure 8:
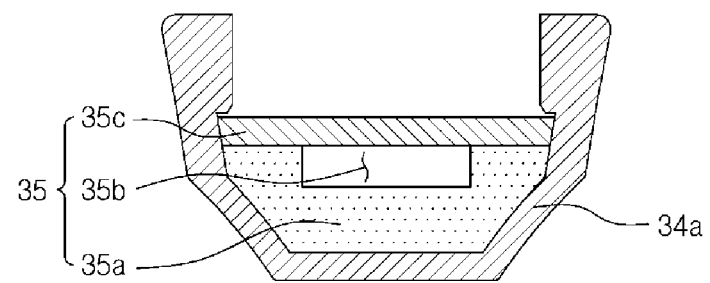
FIG. 8 to FIG. 10 are enlarged views illustrating a structure in which a coupling hole is formed in a cover member of a wiper device according to an embodiment of the present invention.
Figure 9:
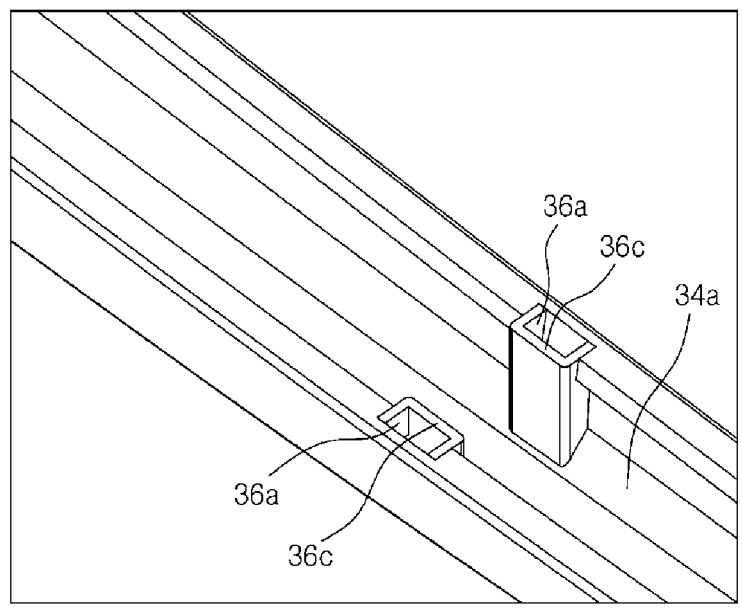
Figure 10:
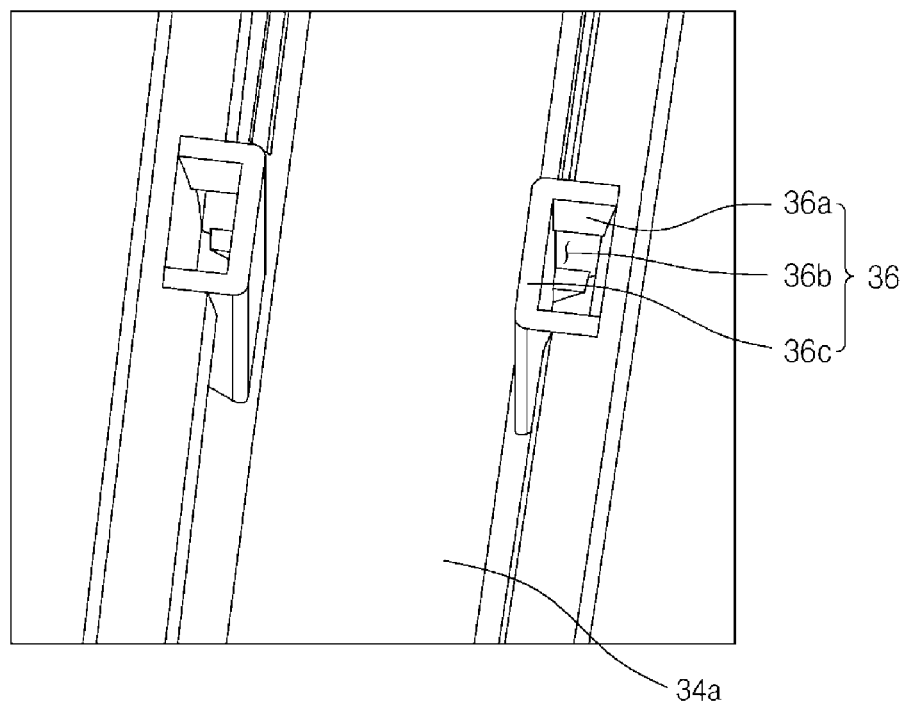

FIG. 7 is a diagram illustrating a cover member in a wiper device according to an embodiment of the present invention and FIG. 8 to FIG. 10 are enlarged views illustrating a structure in which coupling holes 35b and 36b are formed in a cover member of a wiper device according to an embodiment of the present invention. FIG. 8 illustrates a cross-sectional view taken along line "C-C" in FIG. 7. FIG. 9 and FIG. 10 are enlarged views of a "D" portion in FIG. 7.

Referring to FIG. 7, a plurality of supporting units 35 and 36 may be formed on the cover member 30 of the present embodiment. For example, the extension cover 34 may include a first supporting unit 35 and a second supporting unit 36 to which the first coupling unit 27 and the second coupling unit 23 of the above-described pressing member are respectively coupled.

Referring to FIG. 8, the first supporting unit 35 may include a partition wall 35a in which a coupling hole 35b is formed. The partition wall 35a may be formed to cross the inside of the body 34a of the extension cover 34 and the coupling hole 35b may be formed to penetrate the partition wall 35a. Here, a reinforcing member 35c may be coupled to the partition wall 35a in order to reinforce the partition wall 35a. The reinforcing member 35c may be a reinforcing bar coupled to one side of the partition wall 35a. The reinforcing member 35c may not be limited to the above-described form of the present embodiment but may be formed in any shape as long as it can increase the strength of the partition wall 35a.

Accordingly, the inserting unit 27a of the first coupling unit 27 formed extending in an insertion direction of the coupling hole 35b may pass through the coupling hole 35b, and the fixing unit 27b formed on the side surface of the inserting unit 27a may be hooked to and supported by the partition wall 35a.

The partition wall 35a may be made of a material that can be elastically deformed (for example, synthetic resin). A width of the portion where the fixing unit 27b is formed in the coupling unit 27 may be greater than that of the coupling hole 35b. Accordingly, the fixing unit 27b may be inserted when the partition wall 35a is elastically deformed and the coupling hole 35b is widened. Then, when the partition wall 35a is restored to its original state after the fixing unit 27b passes through the coupling hole 35b, the fixing unit 27b may be hooked to and supported by the partition wall 35a.

Particularly, since the fixing unit 27b of the first coupling unit 27 is formed in the shape of an arrow or wedge pointing outward, the portion facing the partition wall 35a in the fixing unit 27b (that is, the portion facing inward) becomes sharp and, thus, the fixing unit 27b may be fixed to the partition wall 35a in the form of an anchor. Therefore, the coupling unit does not come off from the supporting unit and, thus, it is possible to effectively prevent the cover member from being separated from the pressing member.

Referring to FIG. 9 and FIG. 10, the second supporting unit 36 may also include a partition wall 36a in which a coupling hole 36b is formed. The partition wall 36a may be formed to be protruded from the body of the extension cover toward the inner surface. The coupling hole 36b may be formed in a form penetrating the partition wall 36a. Here, the reinforcing member 36c may be coupled to the partition wall 36a in order to reinforce the partition wall 36a.

The second supporting unit 36 of the present embodiment may be formed in a pair which may face each other on the inner surface of the body 34a of the extension cover 34. In addition, the partition wall 36a and the reinforcing member 36c may be combined to achieve a high rigidity columnar structure.

Accordingly, the inserting unit 23a of the second coupling unit 23 formed extending in an insertion direction of the coupling hole 36b may pass through the coupling hole 36b, and the fixing unit 23b formed on the side surface of the inserting unit 23a may be hooked to and supported by the partition wall 36a.

Particularly, since the fixing unit 23b of the second coupling unit 23 has a shape facing downward, the fixing unit 23b may be fixed to the partition wall 36a in the form of a hook. Therefore, the coupling unit does not come off from the supporting unit and it is, thus, possible to effectively prevent the cover member from being separated from the pressing member.

Accordingly, as described above, the cover member is attached to the pressing member through three-point couplings by the first coupling unit 27 formed on the upper surface of the yoke 26 and the pair of the second coupling units 23 formed on the ends of the primary lever 22 and it is thus possible to maintain the coupling without being separated even under strong impact.

On the other hand, the adapter 40 may receive the force from the wiper arm and transmit it to the lever structure. The adapter 40 may be coupled to the pressing member 20 and the wiper arm may be connected. For example, the adapter 40 may be mounted by being connected to a connection hole, a connection shaft, or the like formed in the pressing member 20.

Referring to FIG. 1 to FIG. 3, a part of the adapter 40 may be inserted into the connection hole formed in the lever structure to be mounted to the lever structure.

Although a certain embodiment of the present invention has been described above, it shall be appreciated that there can be a variety of permutations and modifications of the present invention by those who are ordinarily skilled in the art to which the present invention pertains without departing from the technical ideas and scope of the present invention, which shall be defined by the appended claims.

It shall be also appreciated that many embodiments other than the embodiment described above are present in the claims of the present invention.

DESCRIPTION OF REFERENCE NUMERALS

10: Contact member
20: Pressing member
22: Primary lever
23: Second coupling unit
23a, 27a: Inserting unit
23b, 27b: Fixing unit
24: Extension lever
26: York
27: First coupling unit
30: Cover member
35: First supporting unit
35a, 36a: Partition wall
35b, 36b: Coupling hole
35c, 36c: Reinforcing member
36: Second supporting unit
40: Adapter

What is claimed is:

1. A wiper device coupled to a wiper arm to remove a foreign substance, comprising:
a contact member configured to wipe off the foreign substance;
a pressing member configured to press the contact member to be in contact with a windshield; and
a cover member configured to cover the pressing member,
wherein the cover member is provided with a supporting unit formed with a coupling hole,
wherein the pressing member is provided with a coupling unit configured to be inserted into the coupling hole to be coupled with the supporting unit,
wherein the coupling unit comprises a first coupling unit protruded in a "¬" shape on an upper surface of the pressing member and provided with an arrow shape pointed outward at an end portion thereof, and
wherein the arrow shape is fixed to a partition wall of the supporting unit to anchor the coupling unit thereto.

2. The wiper device of claim 1, wherein the partition wall is formed with the coupling hole, and wherein the coupling unit comprises an inserting unit extending in an insertion direction of the coupling hole and a fixing unit extending in a lateral direction from the inserting unit to be hooked to and supported by the partition wall.

3. The wiper device of claim 2, wherein the partition wall is made of a material capable of elastic deformation,
   wherein a width of a portion where the fixing unit is formed in the coupling unit is larger than a width of the coupling hole,
   wherein the fixing unit is inserted when the partition wall is elastically deformed and the coupling hole is widened, and
   wherein the fixing unit is hooked to and supported by the partition wall when the partition wall is restored.

4. The wiper device of claim 1, wherein the pressing member comprises a lever structure in which a plurality of levers are connected in a multi-level structure from the wiper arm to the contact member.

5. The wiper device of claim 4, wherein the pressing member comprises a primary lever, a pair of extension levers hinge-connected, respectively, to both ends of the primary lever, and yokes hinge-connected to each extension lever, and wherein the first coupling unit is protruded on an upper surface of one of the yokes.

6. The wiper device of claim 5, wherein the coupling unit comprises a pair of second coupling units extended in a lengthwise direction from both ends of the primary lever, and each of the second coupling units is formed in a hook shape at a lateral surface of each of the ends.

\* \* \* \* \*